Aug. 1, 1939.  C. M. BERNEGAU  2,168,056
SLIDE RULE
Filed Aug. 20, 1937
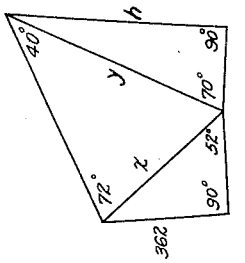
FIG. 5.
FIG. 4.
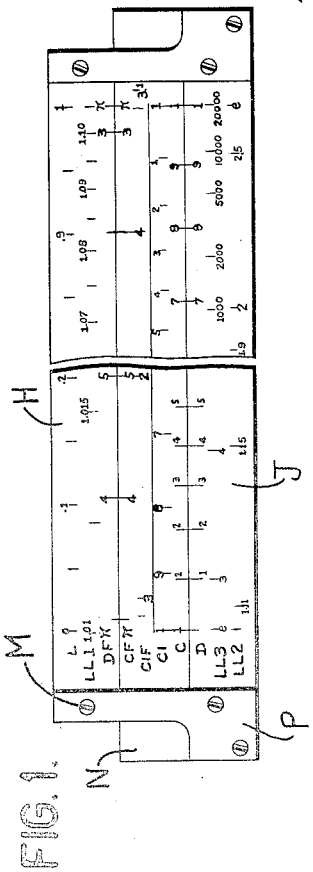
FIG. 1.
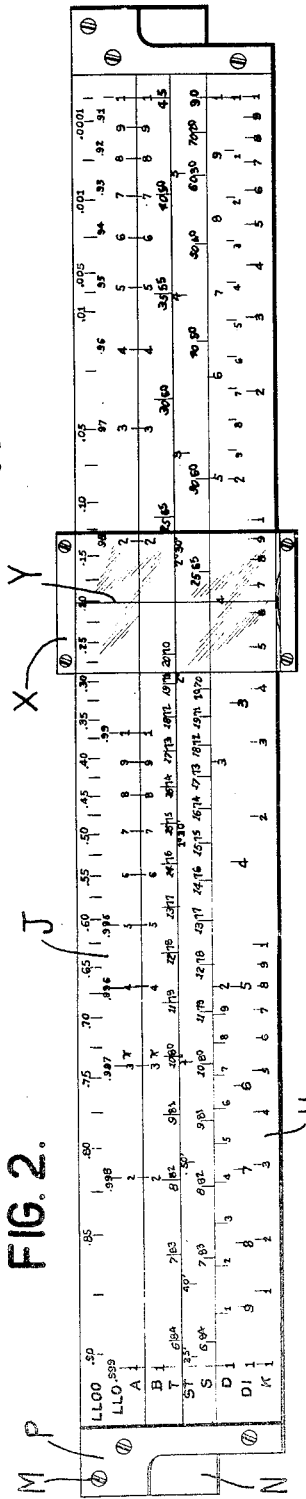
FIG. 2.
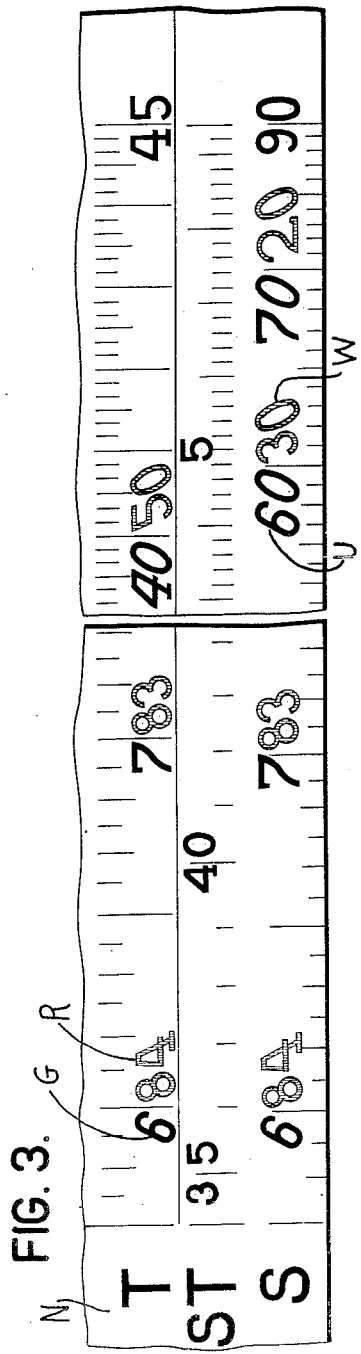
FIG. 3.
INVENTOR
CARL M. BERNEGAU
BY
Acton and Griswold
ATTORNEYS Patented Aug. 1, 1939

2,168,056

UNITED STATES PATENT OFFICE 2,168,056

SLIDE RULE

Carl M. Bernegau, Hoboken, N. J., assignor to Keuffel & Esser Company, Hoboken, N. J., a corporation of New Jersey Application August 20, 1937, Serial No. 160,016

6 Claims. (Cl. 235—70)

This invention relates to slide rules of the kind in which indices in the form of scales adapted to coact with one another in accordance with well known laws are arranged on the respective relatively movable component elements.

Three types of slide rules are in general use. In one type, relatively movable elements reciprocate with respect to one another and on the respective elements are parallel coacting scales. Such slide rules comprise a body member composed of spaced parallel side bars between which reciprocates, as by means of a tongue and groove connection, a slide, the scales appearing on one or both surfaces of the rule. Another type of slide rule involves concentric rotatable discs of progressively varying diameter around the peripheries of which are arranged the coacting scales. So-called cylindrical slide rules consist, usually, in an axially rotatable cylinder on the surface of which are scales extending in the longitudinal direction of the rule while a rotary and usually axially movable slide concentric therewith carries parallel coacting scales. In all these rules the indices or scales are arranged in logarithmic proportions, the arrangement being based upon the principle that the sum of the logarithms of numbers is equal to the logarithm of the product of those numbers. To make computations in multiplication, for instance, it has been the practice to bring the index of one logarithmic scale to the scale divisions representing the logarithm of one of the numbers to be multiplied on a coacting scale and then read the product at the scale division representing the log of that product opposite the scale division on the moved scale representing that number by which it is multiplied. Division is performed as a reverse of this manipulation.

Simple computations have been thus readily effected by movement of the slide with respect to the body and, as the art has progressed, additional coacting scales have been added to slide rules enabling the solution of problems in square and cube root, in trigonometry and in the figuring of fractional powers and roots. A slide rule has been devised by which the right triangle has been solved by a single setting of the rule but in the solution of other problems a sequence of steps has been necessary, each step necessitating the proper relation of slide and body and the making of a notation of the results found after each step in order that the parts may be again manipulated in the performance of a further step using the result found in the previous computations. Each individual problem further required a different method of manipulating a rule so that great difficulty was experienced by all users in determining the proper manipulation to be used in solving problems with which they had not had recent and extensive practice. No slide rule heretofore proposed has ever overcome this difficulty.

In copending application Serial No. 137,400 filed April 17, 1937, there is provided a slide rule, irrespective of type, by which, with the application of not more than two easily understood and readily memorized principles, the user is able to devise the best settings for any particular purpose and to recall settings which have been forgotten. In this slide rule problems involving numerical and trigonometric terms may be solved, irrespective of the number of steps therein, in a continuous manipulation, that is, without the necessity of having to set down a result in order to retain the same while a new setting is made.

An object of the present invention is to facilitate the reading of the trigonometric scales.

Another object of the invention is to facilitate the reading of the trigonometric scales in the aforesaid continuous manipulation.

In carrying the invention into effect, one of two relatively movable members of the slide rule has a scale which is graduated in scale graduations to give readings of angles of the trigonometric function which are found by reference to a logarithmic scale of the same unit length on the other member, the indicia of the first named scale graduations being slanted in the direction in which the angle increases. In respect of the tangent scale, indicia are provided which slant in the direction in which the angle increases while other indicia slant in the opposite direction to indicate the continuation of such scale. Also, if desired, the color of one series of the indicia may contrast with the color of another series of indicia.

These and other objects of the invention and the means for their attainment will be more apparent from the following detailed description, taken in connection with the accompanying drawing illustrating one embodiment by which the invention may be realized and in which:

Figure 1 is a plan view showing one face of the slide rule, the central portion being broken away;

Figure 2 is a similar view showing the reverse face;

Figure 3 is a fragmentary view on an enlarged scale showing the face of the slide of Figure 2;

Figure 4 shows a triangle illustrative of the solution of various problems by the rule of this invention; and Figure 5 shows a closed figure, problems in respect of which may be similarly solved.

In the drawing, side bars H and J are rigidly secured together by means of plates P which are secured thereto at M, so that a sliding bar N may be mounted between said bars H and J so as to be readily slidable longitudinally thereof. The slidable bar N has the usual tongue members on each edge adapted to slide in the usual groove members on the edges of the bars H and J contiguous to the sliding bar N so that the sliding bar N is always held in engagement between the bars H and J in whatever position it occupies longitudinally thereof. A runner or indicator X, transparent on both faces and of any usual construction, is mounted over said bars H, J and N so as to be readily moved into any position desired between the plates P, and the runner X has a hairline Y on each side thereof.

On the front side of the rule, as shown in Figure 1, the upper scale on the bar H is designated as L and is a scale of equal parts from 0 to 1.0 and is used to obtain common logarithms when referred, as will be understood, to the D scale on bar J, referred to hereinafter. The scale next below the L scale on this face is designated as LL1 and has graduations representing logarithms of the logarithms of the numbers 1.01 to 1.11. The scale below the LL1 scale is designed as DF, and is a standard logarithmic scale of full unit length the same as the D scale which is yet to be described, except that it is folded and has its index at the center. This scale is proximate the inner edge of the upper side bar.

The front face, as viewed, of the slide is provided along its upper edge with a scale designated as CF and is identical with the DF scale, on the upper side bar H.

Also on the front face of the slide below the CF scale is a scale designated as CIF, which is a standard folded reciprocal logarithmic scale of full unit length graduated from 10 to 1 similar in every respect to the D scale soon to be described except that it is folded and inverted. Immediately below the CIF scale is the scale designated as CI which is a standard reciprocal logarithmic scale of full unit length graduated from 10 to 1. Below the CI scale and proximate the lower edge of the slide N is a fourth scale designated as C and has standard graduated logarithmic divisions of full unit length from 1 to 10. This scale is the same as the D scale on the body (bar J) next to be described.

On the upper edge of the side bar J proximate the slide is a scale designated as D, which is the same as the C scale and is a standard logarithmic scale of full unit length. Along the lower edge of the side bar J is a scale designated LL2 which has graduations representing the logarithms of logarithms of the numbers from 1.11 to 2.7. The middle scale on the front face of the lower side bar is a scale, designated as LL3, which has graduations representing the logarithms of logarithms of the numbers from 2.7 to 22,000. These three scales LL1, LL2 and LL3 are, conveniently, continuations of each other, as will be clear from the foregoing.

On the rear face of the slide rule, as shown in Figure 2, is a scale designated LL00 along the upper edge of the upper (as viewed) side bar J and immediately below that scale LL00 is a scale designated as LL0 representing the logarithms of co-logarithms between 0.00005 and 0.999. These scales are used to find powers and roots of numbers below unity and to find co-logarithms to any base of numbers below unity. The lower scale on the upper side bar J, on the rear face, is designated A and comprises a standard graduated logarithmic scale of two unit lengths from 1 to 10. The A scale represents the natural co-logarithms of the numbers on the LL0 and LL00 scales.

On the slide N, on this rear face of the rule, and along the upper edge thereof, is a scale designated as B which has the same graduations as the scale A. Immediately below the B scale on the slide is a scale designated as T which is a tangent scale with divisions to represent angles from 5°45' to 45°. This range of angles will give tangents in connection with the C or D scale and cotangents in connection with the CI or DI scale. As shown in Figure 3, the numerals G representing the angles below 45° are indicated in one color, say, black, and slanted in the direction in which the scale is read, while the numerals R indicating the continuation of this scale (45° to 84°15') in the opposite direction are in a different color, say, red, and slant in the opposite direction, i. e., the direction in which the angle increases and in which this scale is read. The angles noted in red will give tangents in connection with the CI or DI scales and cotangents in connection with the C or D scales.

Immediately below the tangent scale T is a scale designated as ST. This scale is used whenever an angle less than 5° 44', that is, an angle whose sine or tangent is less than 0.1, is involved in the solution of a trigonometrical problem. The lowermost scale on the slide N, on the rear face thereof, is the scale designated as S and is a scale graduated to the angles in degrees and minutes from 5° 40' to 90° and is used with reference to the scales C or D from which scales are then read the sines of the angles indicated on the S scale. This scale obviously also enables a reading for the cosine to be obtained on the CI or DI scales when reading, however, in the opposite direction. The numerals U used in obtaining the sine are, therefore, in one color, say, black, and slant in the direction in which the angle increases, while the numerals W used in obtaining the cosine are in a different and contrasting color, say, red, and slant in an opposite direction, i. e., in the direction in which the angle increases and in which this scale is read.

On the lower side bar on the rear face (here the bar H), and along the edge proximate the slide N, is another scale designated as D which is exactly the same as the D scale on the front face hereinbefore described. Below the D scale is a scale designated as DI and is a standard reciprocal logarithmic scale of full unit length graduated from 10 to 1 the same as the D scale except that it is inverted. The lowermost scale on this face is a scale designated as K. This scale is graduated to show the cube of a number in the same transverse line on the D scale and comprises the standard graduated logarithmic scale of three unit lengths. Conversely, of course, the D scale shows the cube root of the corresponding graduation on the K scale. It will be noted that there are three parts to the K scale, each the same as the others except as to position. These parts will be referred to hereinafter as the left hand part, the middle part and the right hand part, or as K left, K middle and K right, respectively. The cube root of a given number is a second number whose cube is the given number.

In order to understand the simplicity of operation of this slide rule, as explained hereinbefore, whereby the operation thereof, irrespective of the number of steps, may be carried out continuously without resetting the parts to a result found in the previous step, the principle of operation for such simple problems as were possible with prior slide rules will first be explained, leading into more complicated problems which are only possible with the slide rule of this invention, in order to explain that the same simple procedure may be applied to all problems whereby the user, having mastered the fundamental rules, is now able with this rule to perform all problems as they arise.

In the following illustration for the sake of brevity, the various scales are referred to merely by their letters such as C, D, etc., instead of "C" scale, "D" scale and the like:

*Example 1*

Evaluate
$$\frac{73.6 \times 3.44}{.5}$$

Solution: The user reasons as follows: first divide 73.6 by .5 and then multiply the result by 3.44. This would suggest Push hairline to 73.6 on D,
Draw .5 on C under the hairline,
Push hairline to 3.44 on C and
Read 506 on D scale.

*Example 2*

Evaluate
$$\frac{18 \times 45 \times 37}{23 \times 29}$$

Solution: Reason as follows: (a) divide 18 by 23, (b) multiply the result by 45, (c) divide this second result by 29, (d) multiply this third result by 37. This suggests to Push hairline to 18 on D
Draw 23 on C to hairline,
Push hairline to 45 on C,
Draw 29 on C to hairline,
Push hairline to 37 on C and
Read 449 on D scale.

To determine the decimal point in the answer, a rough approximation is made. For the above example write $$\frac{20 \times 40 \times 40}{20 \times 30} = \text{about } 50$$

Hence the answer is 44.9.

There are other slide rules by means of which the foregoing examples can be solved as readily as on the slide rule of this invention. Their presentation here is only for the purpose of showing that the same principle and the same procedure used in solving these relatively simple problems are also applicable for solving problems involving trigonometric functions on this slide rule. This is possible due to the fact that all trigonometric scales are of a common full CD unit length and that they are rendered more flexible by being placed on the slide.

The following group of examples exemplify this:

*Example 3*

Evaluate
$$\frac{73.6 \times 3.44}{\sin 30°}$$

Solution:

To 73.6 on D scale
Draw 30° on S scale,
Push hairline to 3.44 on C scale and
Read 506 on D scale.

By comparing this solution with that of Example 1, it will be seen that the two are identical.

*Example 4*

Evaluate
$$\frac{53.5}{2.25 \sin 13°30'}$$

Solution:

$$\frac{53.5}{2.25 \sin 13°30'} = \frac{53.5 \frac{1}{2.25}}{\sin 13°30'}$$

To 53.5 on D scale
Draw 13°30' on S scale,
Push hairline to 2.25 on CIF scale and
Read 101.9 on DF scale.

*Example 5*

Evaluate
$$\frac{17 \cos 50°30'}{\tan 12° \sin 59'}$$

Solution (compare with Example 2):

$$\frac{17 \cos 50°30'}{\tan 12° \sin 59'} = \frac{17 \cos 50°30' \times 1}{\tan 12° \sin 59'}$$

To 17 on D scale
Draw 12° on T scale,
Push hairline to 50°30' on S (red),
Draw 59' on ST scale to hairline,
Push hairline to 1 (index) of C scale and
Read 2960 on D scale.

*Example 6*

Evaluate
$$\frac{\sqrt{2.9} \cos 16°}{\tan 16°}$$

Solution:

To 2.9 on A scale
Draw 16° on T scale,
Push hairline to 16° on S (red) and
Read 5.71 on D scale.

*Example 7*

Evaluate
$$\frac{\tan 15°}{\cos 20° \sin 25°}$$

Solution: This expression has one more factor in the denominator than in the numerator. To fulfill the statement given in Example 3, explained in the copending application, it would be necessary to transpose one factor from the denominator to the numerator in form of its reciprocal. But there are no inverted trigonometrical scales on the rule. However, by inserting unity twice in the numerator, we will have the desired condition. Thus:

$$\frac{\tan 15°}{\cos 20° \sin 25°} = \frac{1 \times \tan 15° \times 1}{\cos 20° \sin 25°}$$

To 1 on D scale
Draw 20° on S (red),
Push hairline to 15° on T scale,
Draw 25° on S scale to hairline,
Push hairline to 1 on C scale and
Read .675 on D scale.

*Example 8*

Evaluate
$$\frac{22 \cos^2 33°}{93}$$

Solution:

To 22 on A scale
Draw 93 on B scale,
Push hairline to 33° on S (red) and
Read .166 on A scale.

Example 9

Evaluate $$\frac{(8.2)^2 \tan^2 21°}{\sin^2 40°}$$

Solution:

To 8.2 on C scale
    Draw 40° on S scale,
    Push hairline to 21° on T scale and
    Read 23.95 on A scale.

Example 10

Evaluate $$\frac{3865\sqrt{7.83}\times 75 \sin 38°}{\tan 36° \cos 25°} = \frac{3865\sqrt{7.83}\sin 38°\times 1}{(1/75)\tan 36° \cos 25°}$$

Solution:

To 3865 on D scale
    Draw 75 on CI scale,
    Push hairline to 7.83 on B left,
    Draw 36 on T under hairline
    Push hairline to 38 on S,
    Draw 25 on S (red) under hairline,
    At index of C scale,
    Read 758,800 on D scale.

These examples show that the same settings for simple multiplication and division on the C and D scales are also used when trigonometric functions are introduced. To evaluate the expression of Example 10 on a rule with trigonometric scales of unequal unit lengths or a rule where trigonometric scales are placed on the body of the rule, one would probably first replace two of the trigonometric functions by their actual numerical values and then proceed as above. Much of the simplicity of operation of this slide rule consists in the fact that a single type of setting applies without exception in the case of combined multiplication and division problems whether they are simple or complex.

The arrangement of scales of this rule permit the use of the same law for solving triangles wherever possible without reverting to the opposite side of the rule. Thus to solve the triangle shown in Figure 4:

To 381 on D scale
    Draw 66 on S scale,
    Push hairline to 42° on S scale
    And read $a=279$ (answer) on D scale;
    Push hairline to 72° on S scale
    And read $b=396$ (answer) on D scale.

To obtain further knowledge of the simplicity of operation of this slide rule, attention is directed to the problem of finding the length $h$ of the closed figure shown in Figure 5.

Solution:

To 362 on D scale
    Draw 52° on S scale,
    Push hairline to 90° on S,
    Draw 40° under hairline,
    Push hairline to 72° on S,
    Draw 90° on S under hairline,
    Push hairline to 70° on S
    And read $h=637$ on D.

The process consists of a succession of movements of the slide and of the hairline with a final reading of the desired quantity. To solve the same problem on a rule with trigonometric scales located on the body, the three triangles would have to be solved separately by reading the sides marked $x$ and $y$ as intermittent results.

Example 11

Evaluate $$\frac{\log_e 1.4 \sin 45°}{\cos 70°}$$

Solution:

To 1.4 on LL2 scale
    Draw 70° on S (red),
    Push indicator to 45 on S scale and
    Read .6955 on D scale.

Example 12

Evaluate $$\frac{\cos 79°05' \log_e 1.0498 \sec 70°10'}{\sin 55°}$$

Solution:

To 1.0498 on LL1
    Draw 55° on S,
    Push hairline to 79°05' on S (red),
    Draw 70°10' on S (red) to hairline and
    Read at the index .03319 on D.

Example 13

Evaluate $$\sqrt{16.2}\, \log_e 135\, \csc 60°$$

Solution:

To 135 on LL3 scale
    Draw 60° on S scale,
    Push hairline to 16.2 on B and
    Read 22.8 on D scale.

As said before, the first group of examples can be solved with some prior slide rules in the same manner as presented here. The advantage of this slide rule over all other rules is apparent in solving trigonometric problems. To demonstrate this advantage more clearly, the slide rule shown in United States Patent 1,488,686 is selected as the most advanced slide rule heretofore proposed, and the same examples as solved on the rule of the present invention are solved on the earlier rule in the following manner: By referring to the same examples noted, the difference between the two solutions will be clearly seen.

Example 3

$$\frac{73.6\times 3.44}{\sin 30°}$$

Solution:

To 73.6 on scale A
    Set 30° on scale S
    At 3.44 on scale B
    Read 506 on scale A.

This solution is the same as on the slide rule of this invention, with the exception that, on such slide rule, scales of 25 c/m unit length can be used while on the rule of the patent, scales of only 12.5 c/m unit length have to be used. This naturally tends to make the answer more accurate on the rule of this invention.

Example 4

Evaluate $$\frac{53.5}{2.25 \sin 13°30'}$$

Solution:

To 53.5 on A scale
    Set 13°30' on S scale
    Hairline to left index of B scale
    Set 2.25 on B scale under hairline
    And opposite index on B scale
    Read 101.9 on A scale.

Two movements of the slide are required on 12.5 c/m unit scales, while on the slide rule of this invention only one movement of the slide is necessary. The reason is that there 25 c/m unit scales are used, and, therefore, advantage of the inverted scales could be taken.

*Example 5*

Evaluate
$$\frac{17 \cos 50°31'}{\tan 12° \sin 59'}$$

Solution: The trigonometric scales of the rule of the patent are not numbered for complements; therefore
$$\cos 50°30' = \sin (90° - 50°30') = \sin 39°30'$$

Since the T scale is of different unit length, it can not be used in conjunction with the S scale. Therefore, the natural tangent of 12° must first be found:

Opposite 12° on T scale
Read .2125 on C scale.

The problem now is
$$\frac{17 \sin 39°30'}{.2125 \sin 59'}$$

To 17 on A scale
Set .2125 on B scale
Hairline to 39°30' on S scale;
59' on S scale to hairline
At index of B scale
Read 2960 on A scale.

Usually a user will prefer to find the numerical values of all the trigonometric functions in the computation and then proceed as in regular multiplication and division, in order to use 25 c/m unit scales.

*Example 6*

Evaluate
$$\frac{\sqrt{2.9} \cos 16°}{\tan 16°}$$

Solution: Here the natural cosine of 16° must be inserted, since the square root is involved and this is found on the D scale.

$\cos 16° = \sin (90° - 16°) = \sin 74°$
At 74° on S scale read
.96 on B scale

The example now is
$$\frac{\sqrt{2.9} \times .96}{\tan 16°}$$

To 2.9 on A scale
Set 16° on T scale
Opposite .96 on C scale
Read 5.7 on D scale.

*Example 7*

Evaluate
$$\frac{\tan 15°}{\cos 20° \sin 25°}$$

Solution:

At 15° on T scale
Read .268 on C scale.
At (90°−20°)=70° on S scale
Read .94 on B scale.
At 25° on S scale
Read .423 on B scale.

The example now is
$$\frac{.268}{.94 \times .423}$$

To .268 on D scale
Set .423 on C scale
At .94 on CIF scale
Read .674 on DF scale.

It is easily seen that the solution on the rule of this invention is much simpler and quicker.

*Example 8*

Evaluate
$$\frac{22 \cos^2 33°}{93}$$

Solution:

$\cos^2 33° = \sin^2 (90° - 33°) = \sin^2 57°$
At 57° on S scale
Read .839 on B scale.

The problem now is
$$\frac{22 (.839)^2}{93}$$

To 22 on A scale
Set 93 on B scale.
At .839 on C scale
Read .166 on A scale.

*Example 9*

Evaluate
$$\frac{(8.2)^2 \tan^2 21°}{\sin^2 40°}$$

Solution:

At 40° on S scale
Read $\sin 40° = .642$ on B scale.
To 8.2 on D scale
Set .642 on C scale.
At 21° on T scale
Read 24 on A scale.

*Example 10*

Evaluate
$$\frac{3865\sqrt{7.83}\ 75 \sin 38°}{\tan 36° \cos 25°}$$

Solution: Again first find the numerical values of the trigonometric functions, and then proceed with multiplication and division.

At 38° on S scale
Read .616 on B scale.
At 90°−25°=65° on S scale
Read .906 on B scale.
At 36° on T scale
Read .726 on D scale.

The problem now is:
$$\frac{3865\sqrt{7.83}\ 75 \times .616}{.726 \times .906}$$

This is solved in the customary way.

It is seen that in almost every problem in which trigonometric functions occur either in the numerator or in the denominator, the solution on the rule of this invention will be much simpler and the result in most cases more accurate than on the rule of the patent due to the fact that all trigonometric scales are of the same unit length and may be, for instance, 25 c/m long, which permits them to work in conjunction with all the other scales on the rule.

*Example 11*

Evaluate
$$\frac{\log_e 1.4 \sin 45°}{\cos 70°}$$

Solution: The natural logarithms of numbers above unity are found on LL3, LL2, and LL1. These scales are of 25 c/m unit lengths while the S scale is of 12.5 c/m unit length. Therefore the natural functions of sin 45° and cos 70° have to be inserted in the above problem.

Cos 70°=sin (90°−70°)=sin 20°
Opposite 20° on S scale
Read .342 on B scale.
Opposite 45° on S scale
Read .707 on B scale.

The problem now reads:

$$\frac{\log_e 1.4 \times .707}{.342}$$

To 1.4 on LL2 scale
Set .342 on C scale.
Opposite .707 on C scale
Read .695 on D scale.

*Example 12*

Evaluate $$\frac{\cos 79°05' \log_e 1.0498 \sec 70°10'}{\sin 55°}$$

Solution: Here again all the trigonometric functions are found on a 12.5 c/m unit length scale, namely the S scale. Therefore their numerical value has to be found first.

Cos 79°05'=sin (90°−79°05')=sin 10°55'
At 10°55' on S scale
Read .1895 on B scale.

$$\sec 70°10' = \frac{1}{\cos 70°10'} = \frac{1}{\sin (90° - 70°10')}$$

$$= \frac{1}{\sin 19°50'}$$

At 19°50' on S scale
Read .34 on B scale $$\frac{1}{\sin 19°50'} = \frac{1}{.34}$$

At 55° on S scale
Read .82 on B scale

The problem now is:

$$\frac{.1895 \log_e 1.0498}{.82 \times .34}$$

To 1.0498 on LL1 scale
Set .82 on C scale.
Hairline to .1895 on C scale.
.34 on C scale to hairline
At index of C read .033 on D scale.

*Example 13*

Evaluate $$\sqrt{16.2} \log_e 135 \csc 60$$

Solution:

$$\csc 60° = \frac{1}{\sin 60°}$$

At 60° on S scale
Read .866 on B scale.
To 135 on LL3 scale
Set .866 on C scale
At 16.2 on B scale
Read 22.75 on D scale.

It will thus be seen that a slide rule has been provided in which one of the members is graduated in scale graduations to give readings of angles, the trigonometric function of which is found by reference to a logarithmic scale, the indices of the scale graduations on the first member being slanted in the direction in which the angle increases to facilitate the visual selection of the desired scale graduation, the respective colors of the indicia of complementary angles being contrasting.

Various modifications will occur to those skilled in the art in the type of slide rule employing this invention as well as in the selection and/or disposition of the scales and no limitation is intended by the phraseology of the foregoing specification or illustrations in the accompanying drawing except as indicated by the appended claims.

What is claimed is:

1. A slide rule comprising two relatively movable members, one of said members being graduated in scale graduations to give readings of angles the trigonometric function of which is found by reference to a logarithmic scale of the same unit length on the other member, the indicia of the scale graduations on the first member being slanted in the direction in which the angle increases.

2. A slide rule comprising two relatively movable members, one of said members having a scale graduated in scale graduations to give readings of angles the trigonometric function of which is found by reference to a logarithmic scale on the other member, said graduations being provided with indicia giving the angle the sine of which is found on said logarithmic scale, said indicia slanting in the direction in which the angle increases.

3. A slide rule comprising two relatively movable members, one of said members having a scale graduated in scale graduations to give readings of angles the trigonometric function of which is found by reference to a logarithmic scale on the other member, said graduations being provided with indicia giving the angle the sine of which is found on said logarithmic scale, said indicia slanting in the direction in which the angle increases and other indicia giving the angle of the cosine thereof and slanting in the direction in which the scale is read for the cosine of the angle.

4. A slide rule comprising two relatively movable members, one of said members having a scale graduated in scale graduations to give readings of angles the trigonometric function of which is found by reference to a logarithmic scale on the other member, said graduations being provided with indicia giving the angle the tangent of which is found on said logarithmic scale, said indicia slanting in the direction in which the angle increases.

5. A slide rule comprising two relatively movable members, one of said members having a scale graduated in scale graduations to give readings of angles the trigonometric function of which is found by reference to a logarithmic scale on the other member, said graduations being provided with indicia giving the angle the tangent of which is found on said logarithmic scale, said indicia slanting in the direction in which the angle increases and other indicia slanting in the opposite direction to indicate the continuation of said scale.

6. A slide rule comprising two relatively movable members, one of said members being graduated in scale graduations giving readings of angles and compliments of the angles, the trigonometric function of which is found by reference to a logarithmic scale of the same unit length on the other member, the indicia of the scale graduations on the first member being slanted in the direction in which the angle increases.

CARL M. BERNEGAU.

Certificate of Correction

Patent No. 2,168,056. Aug. 1, 1939.

CARL M. BERNEGAU

It is hereby certified that error appears in the printed specification of the above numbered patent requiring correction as follows: Page 5, first column, line 13, Example 5, for that portion of the formula reading "cos 50° 30′=sin" read *cos 50° 30′—sin*; and that the said Letters Patent should be read with this correction therein that the same may conform to the record of the case in the Patent Office.

Signed and sealed this 12th day of September, A. D. 1939.

[SEAL]

HENRY VAN ARSDALE,
*Acting Commissioner of Patents.*